July 5, 1960 A. A. AUERBACH ET AL 2,944,248

DATA TRANSFER DEVICE

Filed Feb. 23, 1955 4 Sheets-Sheet 1

MAGNETIC TAPE 12

INVENTORS.
ROBERT F. SHAW
& ALBERT A. AUERBACH
BY S.C. Yuter
ATTORNEY

July 5, 1960 A. A. AUERBACH ET AL 2,944,248

DATA TRANSFER DEVICE

Filed Feb. 23, 1955 4 Sheets-Sheet 2

INVENTORS.
ROBERT F. SHAW
& ALBERT A. AUERBACH
BY S.C. Yuter
ATTORNEY

CONTROL 40

INVENTORS.
ROBERT F. SHAW
& ALBERT A. AUERBACH
BY S.C. Yuter
ATTORNEY

July 5, 1960 A. A. AUERBACH ET AL 2,944,248

DATA TRANSFER DEVICE

Filed Feb. 23, 1955 4 Sheets-Sheet 4

INVENTORS.
ROBERT F. SHAW
& ALBERT A. AUERBACH
BY S. C. Yuter
ATTORNEY

United States Patent Office 2,944,248

Patented July 5, 1960

2,944,248

DATA TRANSFER DEVICE

Albert A. Auerbach, Hollis, and Robert F. Shaw, New York, N.Y., assignors, by mesne assignments, to Curtiss-Wright Corporation, Carlstadt, N.J., a corporation of Delaware Filed Feb. 23, 1955, Ser. No. 489,933

4 Claims. (Cl. 340—174)

This invention relates to information handling systems and more particularly to apparatus for detecting and correcting errors that occur in transferring information to or from storage devices.

Information in the form of signals can be stored in storage apparatus such as a cathode ray tube storage, acoustic delay lines, ferromagnetic and ferroelectric matrices, etc. In many instances magnetic tape is an extremely useful storage device.

When magnetic tape is used for information storage, it is convenient to represent the information as coded combinations of the binary digits one (1) and zero (0). The information in binary form is stored in discrete areas along the length of the tape, where an area of positive magnetization indicates binary one and an area of either zero or negative magnetization indicates binary zero.

For purposes of interpreting the stored information, the magnetic tape is moved past a magnetic reading head. The areas of magnetization passing opposite the reading head induce voltages in the head indicating the magnetic state of the area being sensed or read. Thus when the tape moves past the head the discrete areas of magnetization induce a series of signals representing binary zeros and ones.

The information, as represented by the magnetic areas, is normally arranged to occupy locations in a narrow strip or channel along the length of the tape. The information in a channel is usually divided into blocks of a predetermined number of binary digits.

For example, in a typical case, where a magnetic tape serves as an auxiliary memory for a digital computer, the number of binary digits in a block is equal to a submultiple of the capacity of the computer's main memory. The main memory is then conveniently loaded by transferring blocks of information from the magnetic tape.

To insure that a transfer of information begins at the start of a block and terminates at the end of a block, an indication or "block marker" is recorded on the tape defining the limits of complete blocks of information. Hence, under normal operating conditions, a fixed number of binary digits are transferred when the tape travels a distance defined by the block markers. In some instances variable length blocks of information are also handled.

Unfortunately, it has been found that new tape may be improperly manufactured and that random locations on the tape are not suitable for storing information. Errors can occur which result in the transfer of wrong information from the tape.

To eliminate the possibility of this type of error, each new tape is electronically inspected before being used. Signals are recorded on the tape beside each area that can accurately store information. These signals, called sprocket pulses, indicate where a binary digit can be stored during a recording operation. During a reading operation the sprocket pulses indicate where a binary digit has been stored. This type of magnetic tape is described and claimed in the copending application of Samuel Lubkin, Serial No. 369,927, filed July 23, 1953 (now abandoned), and assigned to the same assignee.

After the tape has been processed with sprocket pulses, there is still a possibility of transferring information to or from unsuitable areas of tape. These transfers are the result of spurious sprockets which are usually transient in nature.

Transient errors are often due to dust lodged on the tape or to temporary voltage surges in the equipment. Dust lodged on the tape may sometimes be removed when the tape travels past the magnetic head. Hence, after the removal of the dust or the termination of a voltage surge the tape is again error free.

Heretofore, when means were provided for the detection of transient errors, the detection means functioned to halt the transfer operation or to prevent subsequent operations on the erroneous data. It was then necessary for an operator to rewind the tape and reinitiate the transfer operation. The manual reinitiation of the transfer operation is time consuming and when the magnetic tapes are used in conjunction with a high speed digital computer the computing time is greatly increased.

It is therefore an object of the invention to provide improved apparatus for detecting and correcting errors occurring during a transfer operation.

It is another object of the invention to provide apparatus which automatically performs the detection and correction of errors in transfer operations.

A further object of the invention is to provide apparatus which, upon the detection of an error in a transfer operation, causes the transfer operation to be repeated.

Apparatus is provided in accordance with the invention for counting the number of units of information (binary digits) transferred to or from a storage medium. Upon receiving a signal from the storage medium, a test of the magnitude of the count is performed. If the magnitude of the count is equal to a predetermined value (the fixed number of binary digits in a block) the transfer operation is terminated. If the magnitude of the count is not the predetermined value, indicating an error in the transfer operation, control apparatus causes the transfer operation to be repeated.

A feature of the invention is the use of signals from the storage medium to control testing the magnitude of the count and terminating the transfer operation.

It should be noted that the invention permits highly reliable transfer operations requiring a negligible amount of human supervision.

Other objects, features and advantages will appear in the subsequent detailed description which is accompanied by drawings wherein:

Fig. 1*a* is a schematic block diagram of error detecting and correcting apparatus in accordance with the invention.

Fig. 1*b* illustrates a portion of magnetic tape shown in Fig. 1*a*.

Figure 4A:
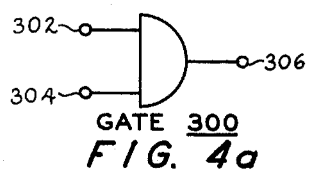

Fig. 4*a* shows the symbol used to designate a gate.

Figure 4B:
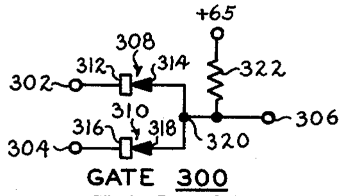

Fig. 4*b* schematically shows the gate of Fig. 4*a*.

Figure 5A:
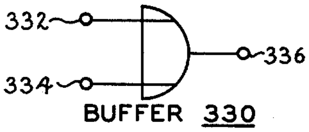

Fig. 5*a* is the symbolic representation of a buffer.

Figure 5B:
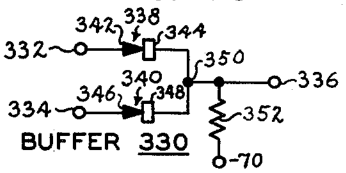

Fig. 5*b* shows in schematic form the buffer represented in Fig. 5*a*.

Figure 6A:
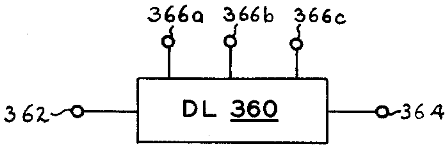

Fig. 6*a* symbolically shows the representation of a delay line.

Figure 6B:
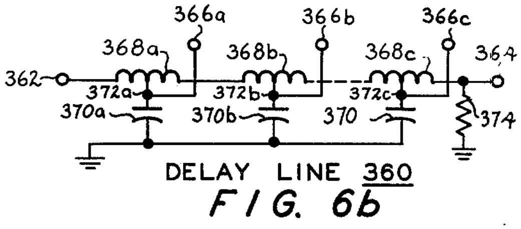

Fig. 6*b* indicates the schematic diagram of the delay line of Fig. 6*a*.

Figures 7A, 7B:
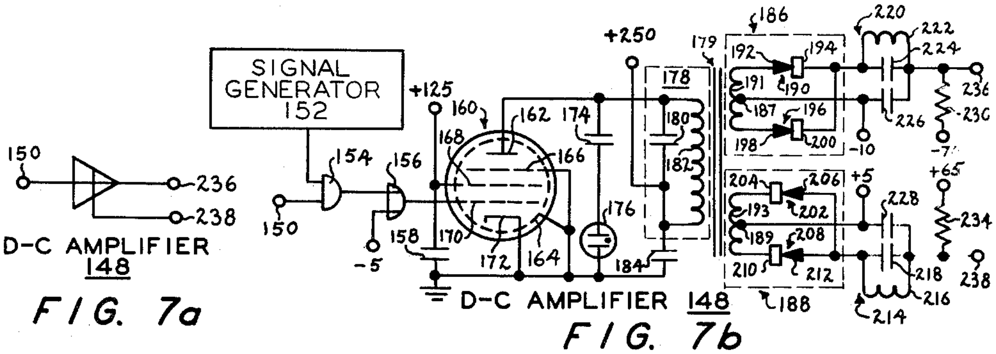

Fig. 7*a* shows the symbolic representation of a D.-C. amplifier.

Fig. 7*b* schematically shows the D.C. amplifier of Fig. 7*a*.

Figure 8A:
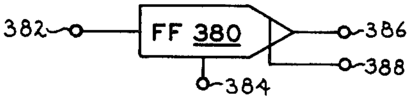

Fig. 8*a* shows in symbolic form a flip flop.

Figure 8B:
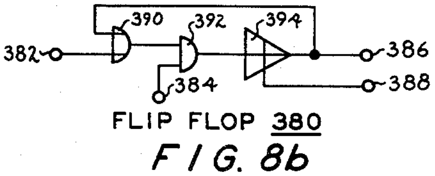

Fig. 8*b* shows by means of symbols the flip flop of Fig. 8*a*.

For purposes of explanation, the invention will be described in connection with a magnetic tape storage device. However, it should be noted that the invention is equally applicable for use with other types of storage systems.

Before the magnetic tape is used in information storage apparatus, the tape is electronically inspected for defects in the recording surface and in one channel of the magnetic tape sprocket pulses are recorded opposite those areas of defect-free tape as is described in detail in the above-cited application.

Figure 1A:
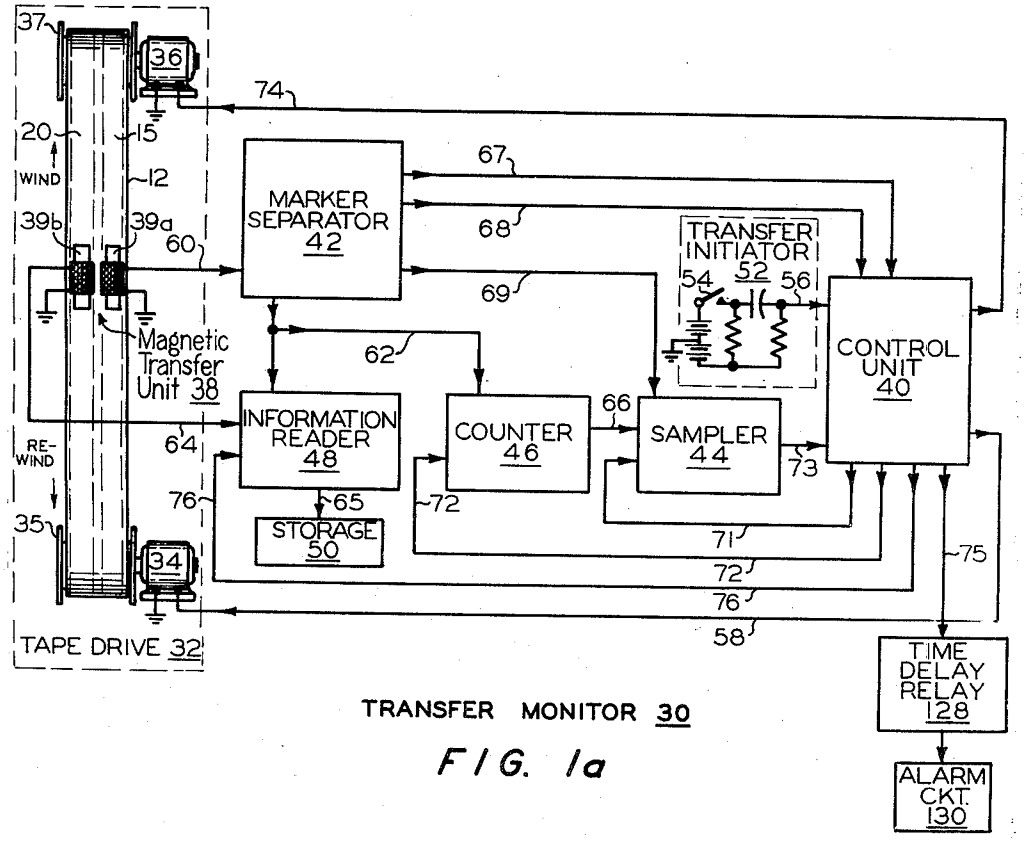
Figure 1B:
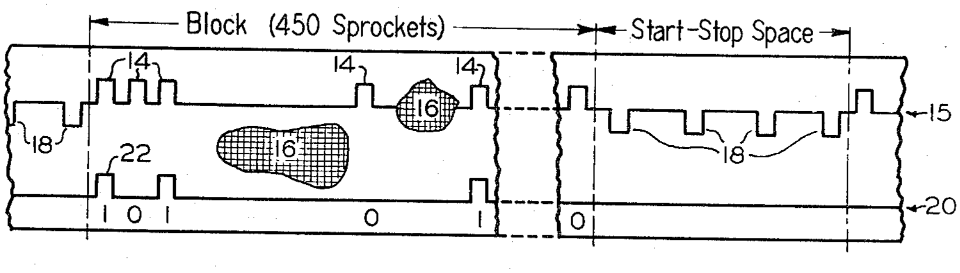

The section of magnetic tape 12 shown in Fig. 1*b* illustrates the locations of sprocket pulses 14 in a control channel 15 with respect to defective areas 16 of the magnetic tape 12.

Block markers 18, pulses of polarity opposite to the polarity of the sprocket pulses, define the limits of a block of information. A block of information is the fixed quantity of information to be transferred at one time. As an example, it will be assumed that four hundred and fifty binary digits constitute a block of information.

The block markers 18 are also recorded on the control channel 15. It is possible for sprocket pulses and block markers to be recorded on different channels but the extra equipment required adds to the expense of the apparatus.

Signals representing information are shown in an information channel 20. The presence of pulse 22 opposite a sprocket pulse 14 indicates the binary digit one and the absence of a pulse opposite a sprocket pulse 14 indicates the binary digit zero. Although one information channel 20 is shown it should be noted that several information channels are usually provided. Although the block marker signals are distinguished from the information signal by different polarity pulses in the same channel it should be realized that other schemes are possible. For example, the signal on control channel can have a high and a low frequency component where the frequency of the signal denotes the kind of signal. In another scheme only sprockets are recorded on the control channel and a special coding of the information in the information channel indicates a block marker.

The transfer monitor 30 is shown in Fig. 1*a*, comprising: the tape drive 32 composed of the magnetic tape 12, the electric motors 34 and 36, and the reels 35 and 37; a magnetic transfer unit 38, comprising several magnetic heads 39; a control unit 40; a marker separator 42; a sampler 44; a counter 46; an information reader 48; a storage 50; a transfer initiator 52 with the switch 54; a time delay relay 128 and an alarm circuit 130.

The electric motors 34 and 36 are connected to the control unit 40 by the lines 58 and 74 respectively. The mangetic head **39*a* for reading control signals (sprocket pulses and block markers) is coupled to the marker separator 42 via line 60. The magnetic head 39*b* of magnetic transfer unit 38 is connected by means of the line 64 to the information reader 48**.

The information reader 48 is coupled to the storage 50 via line 65.

The marker separator 42 is connected to the information reader 48 and the counter 46 via line 62. Lines 67 and 68 couple the marker separator 42 to the control unit 40. The sampler 44 is connected to the marker separator 42 via line 69.

The counter 46 is coupled to the sampler 44 via line 66. The transfer initiator 52 is coupled to the control unit 40 by means of line 56. Line 71 couples the control unit 40 to the sampler 44. The control unit 40 is also connected to the counter 46 via line 72, and the control unit 40 is coupled via line 76 to the information reader 48 and via lines 75 to the time delay relay 128 which in turn is connected to the alarm circuit 130.

A transfer operation is begun by depressing switch 54 of the transfer initiator 52. The closing of switch 54 causes a positive signal to be fed to control unit 40 via line 56. Control unit 40 sends a signal via line 72 to counter 46 for clearing the counter 46 to zero.

Control unit 40 also applies power via line 74 to motor 36 causing reel 37 to start winding the magnetic tape. During the winding operation the tape moves passing under the magnetic transfer unit 38 in a direction toward the motor 36. While the tape moves under the magnetic transfer unit 38, the several magnetic heads 39 begin reading signals from their respective channels on the tape.

The first signals to be read will be block markers recorded on the control channel. These signals read by head **39*a* are fed to the marker separator 42 via line 60**. Block markers are always read first since the tape stops at the end of a previous transfer operation with a region of block markers opposite the head associated with the control channel. Provision is made to ignore block markers at the beginning of a transfer operation.

When the tape has moved past the area of block markers, sprocket pulses begin to be read and are fed to the marker separator 42 via line 60. Coincident with the reading of sprocket pulses information signals are read from one or more channels parallel to the control channel by the head **39*b*. The information signals are fed via line 64 to the information reader 48**.

The sprocket pulses that enter the marker separator 42 are fed via line 62 to both the information reader 48 and the counter 46. At the information reader 48, the sprocket pulses permit the passage of information signals through the information reader 48 to the storage 50 via line 65.

The sprocket pulses are also fed to counter 46 where a count is kept of the total number of sprocket pulses that are read. By keeping a record of the total number of sprocket pulses, a count of the number of units of information in a block is made.

At the end of the block, block markers are again read by the magnetic head **39*a* opposite the control channel and are fed to the marker separator 42 via line 60. Upon receipt of a block marker at the end of the block of information the marker separator 42 sends a signal via line 68 to control unit 40 for deenergizing motor 36 via line 74**.

When the first block marker at the end of the block appeared a signal equivalent to this first block marker is sent from the marker separator 42 to the sampler 44 via line 69. Coincidently a signal representing the first count of the sprocket pulses is fed from counter 46 via line 66 to sampler 44. The coincidence of these two signals is used in testing the total count of the number of sprocket pulses (units of information that have been transferred). If the count is a predetermined value, for this example four hundred and fifty, no error is indicated and the transfer operation is complete and terminated.

If the count is not the predetermined value, that is, any other value but four hundred and fifty, sampler 44 sends a signal via line 73 to control unit 40. Control unit 40 then sends a signal via line 76 to the information reader 48 preventing any possible transfer of information. Control unit 40 by applying power to line 58 energizes motor 34 causing reel 35 to rewind the tape.

During the rewind operation, the magnetic transfer unit 38 continues to read control signals and information signals, but, since information reader 48 is blocked there is no transfer of information. Finally, magnetic transfer unit 38 reads the block marker signals at the beginning of the block of information. The block marker signals are fed to marker separator 42 via line 60.

Marker separator 42 feeds a control signal via line 68 to control unit 40. Control unit 40 generates a signal which is fed via line 72 to clear the counter 46. Control unit 40 also removes power from line 58 deenergizing motor 34 and applies power to line 74 energizing motor 36. The transfer monitor 30 is prepared to start a second transfer of the information.

The second transfer of the information continues in the same manner as the first transfer with a second count being kept by counter 46. If at the end of the block of information that has been transferred, no error exists as indicated by the proper count, the transfer operation is terminated. If an error again exists, the tape is rewound in the manner previously described and a third transfer operation is initiated. If at the end of the third transfer operation an error still exists control unit 40 then generates a signal which completely halts the apparatus and triggers an alarm circuit.

The marker separator 42 which is used to separate pulses of opposite polarities can be the magnetic recording system described and claimed in the copending application of Samuel Lubkin and Daniel Golden, Serial No. 357,502, filed May 26, 1953, now Patent 2,764,463, granted on September 25, 1956. The same type of apparatus is fully described in a paper entitled "An Improved Reading System for Magnetically Recorded Digital Data," by Samuel Lubkin, in the "Transactions of the IRE Professional Group on Electronic Computers," volume EC-3, Number 3, September 1954.

A suitable information reader 48 can also be the same apparatus used for the marker separator 42. In this case, the circuitry used to read the negative pulses can be eliminated since only positive pulses will be written as information.

The storage 50 can be one of several types of conventional storage such as, a magnetic drum or an acoustic delay line.

The counter 46 can be a plurality of binary counters connected in cascade. A suitable binary counter can be found on page 15, Section 3-3, entitled "The Flip-Flop Principle," of "High Speed Computing Devices" by Engineering Research Associates, the first edition, second impression, published by McGraw-Hill.

Since in the example cited, the counter 46 must be able to count to four hundred and fifty, it is therefore necessary to use nine such binary counters. It is also possible to have a counter which will count to a submultiple of four hundred and fifty and have it perform the count a number of times. By simultaneously sampling either the positive or negative outputs of each of the binary counters the desired number can be decoded. For example, if the counter is storing the number four hundred and fifty the first binary counter in the cascade will be in its normally off state or "reset," the second counter will be in its normally on state or "set," the third counter will be reset, the fourth counter reset, the fifth counter reset, the sixth counter reset, the seventh counter set, the eighth counter set, and the ninth counter set, proceeding from least significance to more significance. This is equivalent to the binary number 111000010. If the positive output terminal of all the set flip flops, that is, all the flip flops represented in the state binary one and the negative outputs of all the reset flip flops, that is, all the flip flops representing binary zero are selected then every chosen output should be negative when the count is four hundred and fifty. At any other time, at least one of the chosen outputs will be positive. This condition will be used by sampler 44 to test the number stored in the counter 46.

Figure 2:
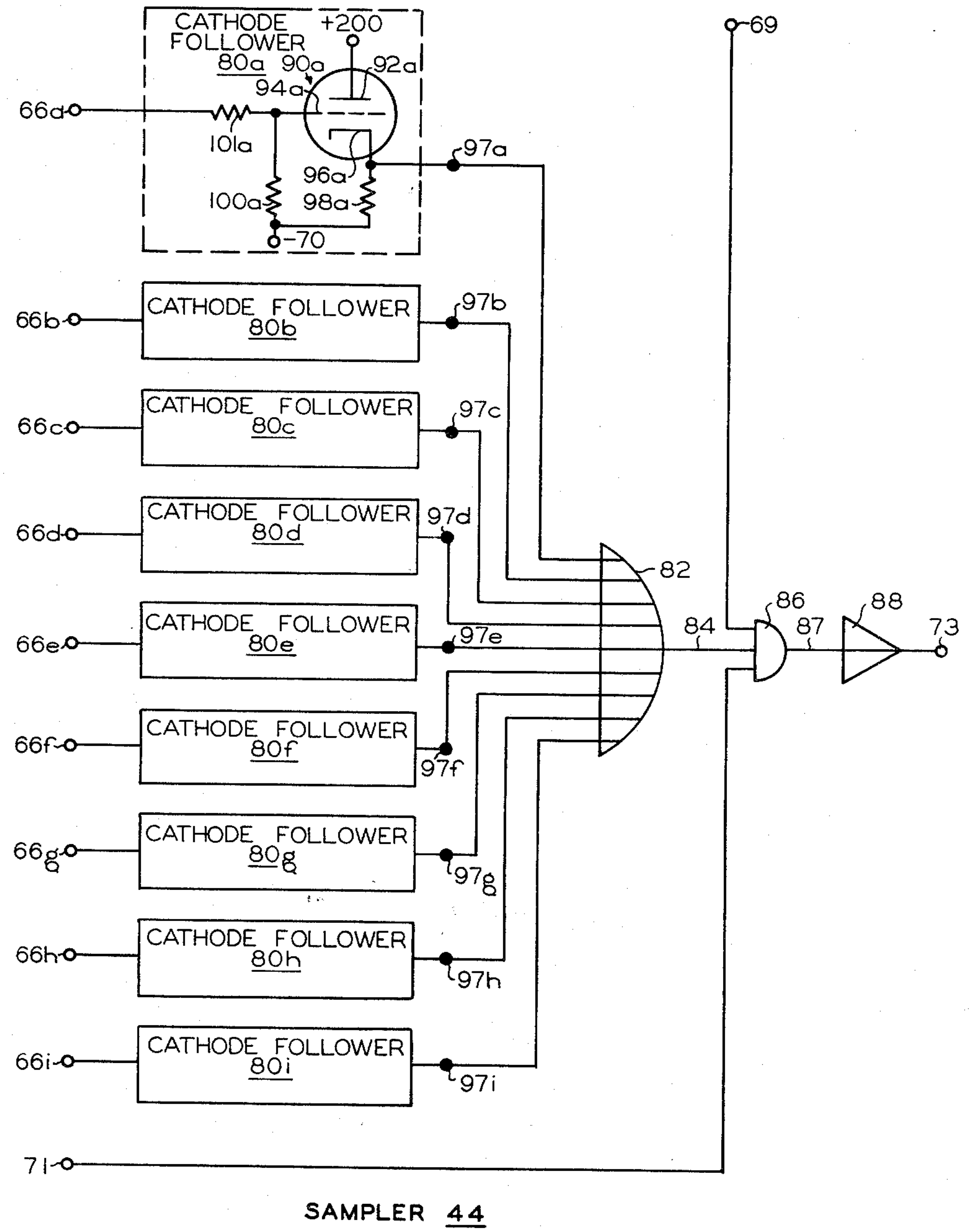
Fig. 2 is a symbolic diagram of the sampler of Fig. 1*a*.

Fig. 2 illustrates the sampler 44. The sampler 44 comprises the input lines 66 from the counter 46, the cathode-follower amplifiers 80, the buffer 82, the gate 86, the D.C. amplifier 88 and output line 73. Each of the lines 66 is connected to the input terminal of a cathode follower 80. The output lines 97 of the cathode followers are connected to buffer 82. The buffer 82 is connected to the gate 86 via the output line 84. The output line 87 couples gate 86 to the D.C. amplifier 88. The output of the D.C. amplifier 88 is connected to line 73.

A typical cathode-follower amplifier 80 comprises a triode vacuum tube 90, with an anode 92 connected to a positive two-hundred volt potential, a grid 94 connected to input line 66 via resistor 101 and a cathode 96 connected to a negative seventy volt potential via a resistor 98, a grid resistor 100 connected from grid 94 to the negative seventy volt potential and an output line 97 connected to the cathode 96.

The cathode-follower amplifiers are used as impedance transformers.

The buffer 82 has an output line 84 and input terminals each connected to the output lines 97 of the cathode-follower amplifiers 80. The buffer 82 will have present on the output line 84 the most positive potential present on any of the lines 97.

The gate 86 has an output line 87 and input terminals connected to lines 69, 71 and 84. The potential existing on output line 87 will be the most negative potential at the input terminals of gate 86. Hence the gate 86 will have a positive potential at the output line 87 only when all three of the input lines 69, 71 and 84 have a positive potential.

The D.C. amplifier 88 has an input terminal connected to line 87 and a positive output terminal connected to line 73. The D.C. amplifier 88 will have a positive potential at its positive output terminal whenever a positive potential exists on line 87.

The sampler 44 operates in the following manner. Signals from counter 46 are continuously fed via lines 66 to the respective grids 94 of the cathode-follower amplifiers 80. The potentials of the cathodes 96 are fed via lines 97 to buffer 82. As was stated above, each of the lines 66 and consequently the lines 97 will all have a negative potential only when the count in the counter 46 has the value four hundred and fifty. Thus only when the count in the counter is four hundred and fifty will the output line 84 of the buffer 82 have a negative potential. For all other values of the count the line 84 will have a positive potential.

The lines 69 and 71 at the input terminals of gate 86 are used in testing the magnitude of the count.

The block marker signals are fed to gate 86 via line 69. Although the block marker signals occur at both the beginning and end of a block of information, the test of the count in the counter 46 should only be performed by the first block marker signal at the end of a block of information. To restrict the test to the desired time a control signal from control unit 40 is fed via line 71 to gate 86. The polarity of the potential on line 71 is controlled to permit only the first block marker signal to be gated through gate 86.

Whether the first block marker signal occurring at the end of a block of information is passed by gate 86 thus depends on the potential of line 84.

If the count in the control counter is four hundred and fifty then the potential of line 84 will be negative and no block marker signal passes through gate 86.

If, however, the count is not four hundred and fifty then the potential of line 84 will be positive and a block marker signal will pass through gate 86 causing the output terminal of D.C. amplifier 88 to assume a positive potential which is fed to line 73. The positive potential on line 73 is fed to the control unit 40 to initiate a reread.

Figure 3:
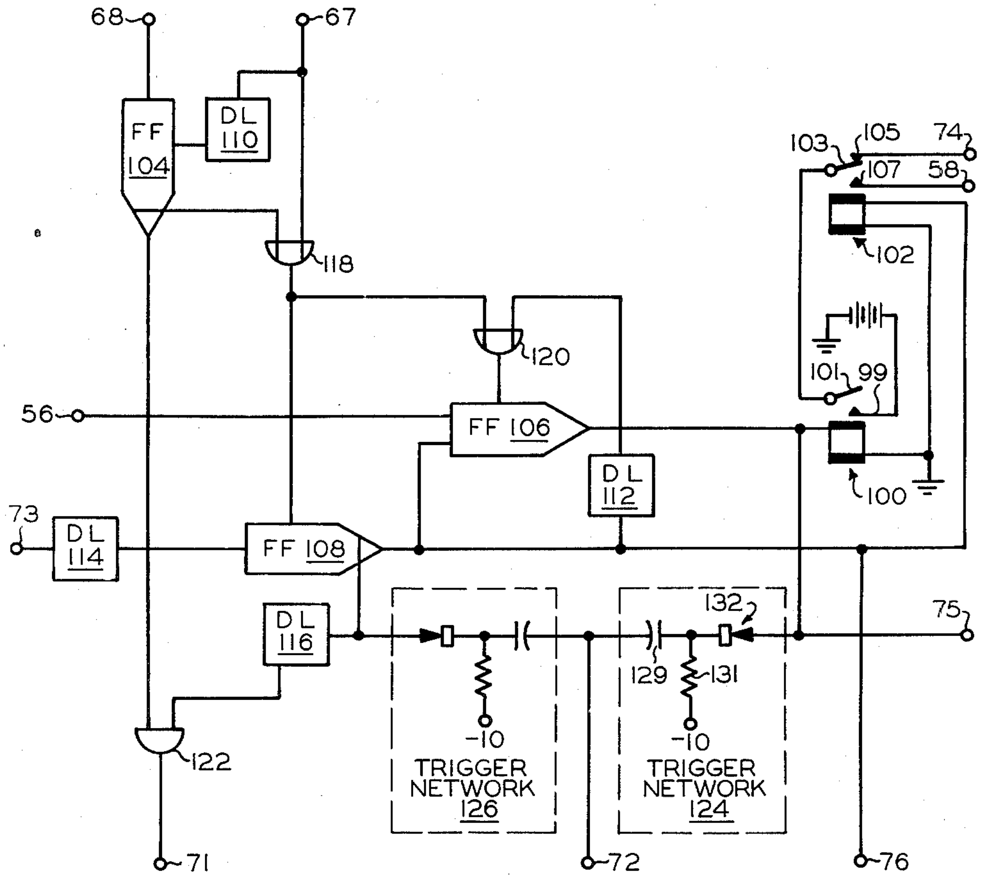
Fig. 3 shows, symbolically, the details of the control unit of Fig. 1.

The control unit 40 is shown in Fig. 3 comprising, relays 100 and 102, flip flops 104, 106, and 108, delay lines 110, 112, 114, and 116, buffers 118 and 120, gate 122, and trigger networks 124 and 126.

The gates and buffers operate in a manner previously described.

The relays 100 and 102 are commercially available current control relays, while time delay relay 128 is a well known control relay which is activated a fixed time after power has been applied to it. The alarm circuit can either be a neon lamp or a buzzer or both. Each of the delay lines 110, 112, 114 and 116 is an electrical network capable of accepting an input signal and producing the same signal at its respective output terminal a fixed time later. The amount of delay introduced by each line is equal to one and a half times the duration of a sprocket pulse or block marker signal.

The flip flops 104, 106 and 108 ae bistable devices whose output terminals are either at a positive or a negative potential. When the flip flop is in a reset condition, turned off, the positive output terminal is at a negative potential and the negative output terminal is at a positive potential. When the flip flop is set, turned on, the potentials of the output terminals change polarity. Each of the flip flops has two control terminals, one, the set input terminal, capable of turning the flip flop on, the other, the rest terminal, capable of shutting the flip flop off.

The trigger networks 124 and 126 are identical. Trigger network 124 comprises a capacitor 129, a resistor 131 and a diode 132. The trigger networks permit differentiated positive square-wave signals to pass to line 72.

The operation of the control unit 40 will now be described. As was stated above a transfer operation is begun by closing switch 54, see Figs. 1 and 3, which applies a positive potential to line 56 causing flip flop 106 to be set. The positive output terminal of flip flop 106 applies power to time delay relay 128 and relay 100. Relay 100 closes and motor power is fed from contact 99 through contact 101 to contact 103 of relay 102. Since relay 102 is not energized motor power is fed to contact 105 and line 74. This causes the tapes to move upward.

When the first sprocket pulse is read it is fed via line 68 to set flip flop 104. After the whole block of information is transferred, block marker signals appear. A signal of negative potential initiated by the block marker signal is generated by marker separator 42 and fed via line 67 to delay line 110 and buffer 118. Since flip flop 104 has been set by the first sprocket to appear, the negative output of flip flop 104 is at a negative potential. Hence, both inputs to buffer 118 are at a negative potential and a negative potential is fed to both an input terminal of buffer 120 and the reset terminal of flip flop 108. Since flip flop 108 was in the reset condition the negative potential present at the reset terminal produces no change in the state of flip flop 108.

With flip flop 108 in the reset condition its positive output terminal is at a negative potential. This negative potential fed through delay line 112 is present at the second input terminal to buffer 120. Therefore both input terminals of buffer 120 are at negative potentials and buffer 120 passes a negative potential to the reset terminal of flip flop 106 causing the reset of flip flop 106. Relay 100 and time delay relay 128 begin to de-energize. The negative potential existing on line 67, delayed for slightly more than the duration of the block marker signal by delay line 110, then resets flip flop 104. If no error was detected nothing further occurs and the transfer operation is ended.

If an error occurred sampler 44 would cause a positive potential to exist on line 73, as was stated above. The positive potential on line 73, after being delayed by delay line 114 sets flip flop 108. The positive output terminal of flip flop 108 assumes a positive potential causing the setting of flip flop 106. With flip flop 106 again in the set condition, relay 100 and time delay relay 128 are re-energized. The interruption of power to either of these relays was so short that their condition had not changed.

The positive output terminal of flip flop 108 also energizes relay 102 causing a closed circuit between contacts 103 and 107 of relay 102. Motor power is thus removed from line 74 de-energizing motor 36 and applied to line 58 energizing motor 34, see Fig. 1. The tape now moves in the opposite (downward) direction. In practice it may be necessary to induce a delay mechanism to permit the tape to smoothly change direction and then come up to proper operating speed.

Block marker signals first appear causing the potential on line 67 to assume a negative value for the duration of each block marker signal. The usual effect of a negative potential on line 67 is not manifested. Flip flop 104 is in a reset condition hence its negative output terminal is at a positive potential. This positive potential at the input terminal of buffer 118 will overide any effect caused by the presence of the negative potential on line 67 connected to the other input terminal of buffer 118.

Since flip flop 104 is in a reset condition, its positive output terminal is at a negative potential. This negative potential therefore exists on line 71 connected to the output terminal of gate 122. Referring to Fig. 2, it is seen that line 71 is connected to an input terminal of gate 86. As long as line 71 is at a negative potential the output terminal of gate 86 will be at a negative potential. Hence any positive potentials on line 69 as a result of block marker signals produce no effect.

The tape continues to rewind and sprocket pulses appear causing flip flop 104 to be set via line 68. Finally, the beginning of the block of information is reached and block marker signals again appear. At the occurrence of the first block marker signal a negative potential is present on line 67. Since flip flop 104 had been set by previous sprocket pulses a negative potential is present at the output terminal of buffer 118 causing the reset of flip flop 108.

The negative potential present at the output terminal of buffer 118 attempts to reset flip flop 106 via buffer 120. The second input terminal of buffer 120 is connected to the positive output terminal of flip flop 108 via delay line 112. By virtue of delay line 112 the potential at this input terminal remains positive until after the disappearance of the negative potential at the output terminal of buffer 118. Therefore flip flop 106 remains in the set condition.

The negative potential present on line 67 delayed by delay line 110 then resets flip-flop 104.

The reset of flip flop 108 causes the negative output terminal to assume a positive potential. The abrupt change from a negative potential to positive potential by the negative output terminal of flip flop 108 causes a positive trigger pulse to be fed to line 72 via trigger circuit 126. The positive trigger pulse present on line 72 clears the counter 46 to zero.

With the counter 46 cleared to zero, flip flop 106 set, flip flops 104 and 108 reset and the tape at the beginning of a block of information a second attempt to correctly transfer the information begins.

The operation proceeds as has been described above. If the operation is again unsuccessful the rewind cycle again occurs followed by a third attempt at a transfer.

The delay in time delay relay 128 is adjusted to permit three attempts at transferring the information. If time delay relay 128 is kept energized longer than the time required for three transfer attempts, the time delay relay 128 then activates alarm circuit 130.

Although, only a description of the transfer of information from a magnetic tape to a storage device has been described, it should be noted that the apparatus can be used to control the transfer of information from a storage unit to the magnetic tape.

Apparatus has been shown which is capable of detecting and correcting errors occurring during the transfer of signals representing information between two storage devices.

It should be noted that the use of magnetic tape apparatus is only for the purposes of illustration and should not be considered as limiting the invention solely to magnetic tapes. Other types of storage devices such as cathode ray tube memories, delay lines or core memories can be used.

*Description of symbols*

The schematic equivalents of the symbols which were employed to simplify the detailed description of the units of the apparatus which have been illustrated in block form are shown in Figs. 4 through 8. For convenient reference, all positive and negative supply buses will generally be identified with a number corresponding with their voltage. The circuitry terminals corresponding to the same symbol terminals are identified by the same character reference numbers.

*Gate*

The gates used in the apparatus are of the "coincidence" type, each comprising a crystal diode network which functions to receive input signals via a plurality of input terminals and to pass the most negative signal.

The symbol for a representative gate 300, having two input terminals 302 and 304, is shown in Fig. 4*a*. In general, the signal potential levels are plus five volts (positive signals) and minus ten volts (negative signals) and the potentials of the signals which may exist at the input terminals 302 and 304 are thereby limited.

If a potential of minus ten volts is present at one or both of the input terminals 302 and 304, a potential of minus ten volts exists at the output terminal 306. Therefore, if one of the input signals to the input terminals 302 and 304 is positive and the other signal is negative, the negative signal is passed and the positive signal is "blocked."

When there is a coincidence of positive signals at the two input terminals 302 and 304, a positive signal is transmitted from the output terminal 306. In such case, it may be stated that a positive signal is "gated" or "passed" by the gate 300.

The schematic details of the gate 300 are shown in Fig. 4*b*. Gate 300 includes the crystal diodes 308 and 310. Each of the input terminals 302 and 304 is coupled to one of the crystal diodes 308 and 310. Crystal diode 308 comprises the cathode 312 and the anode 314. Crystal diode 310 comprises the anode 318 and the cathode 316. More particularly, the input terminals 302 and 304 are respectively coupled to the cathode 312 of the crystal diode 308 and the cathode 316 of the crystal diode 310. The anode 314 of the crystal diode 308 and the anode 318 of the crystal diode 310 are interconnected at the junction 320. The anodes 314 and 318 are coupled via the resistor 332 to the positive voltage bus 65.

If negative potentials are simultaneously present at the input terminals 302 and 304, both of the crystal diodes 308 and 310 conduct, since the positive supply bus 65 tends to make the anodes 314 and 318 more positive. The voltage at the junction 320 will then be minus ten volts since, while conducting, the anodes 314 and 318 of the crystal diodes 308 and 310 assume the potential of the associated cathodes 312 and 316.

When a positive signal is fed only to the input terminal 302, the cathode 312 is raised to a positive five volts potential and is made more positive than the anode 314, so that crystal diode 308 stops conducting. As a result, the potential at the junction 320 remains at the negative ten volts level. In a similar manner, when a positive signal is only present at the input terminal 304, the voltage at the junction 320 will be not be changed.

When the signals present at both input terminals 302 and 304 are positive, the anodes 314 and 318 are raised to approximately the same potential as their associated cathodes 312 and 316 and the potential at the junction 320 rises to a positive potential of five volts.

The potential which exists at the junction 320 is transmitted from the gate 300 via the connected output terminal 306.

In the above described manner, the gate 300 is frequently used as a switch to govern the passage of one signal by the presence of one or more signals which control the operation of the gate 300.

It should be understood that the potentials of plus five volts and minus ten volts used for purpose of illustration are approximate, and the exact potentials will be affected in two ways. First, they will be affected by the value of the resistance 322 and its relation to the impedances of the input circuits connected to the input terminals 302 and 304. Second, they will be affected by the fact that a crystal diode has some resistance (i.e., is not a perfect conductor) when its anode is more positive than its cathode, and furthermore will pass some current (i.e., does not have infinite resistance) when its anode is more negative than its cathode. Nevertheless, the assumption that signal potentials are either plus five or minus ten volts is sufficiently accurate to serve as a basis for the description of the operations taking place in the apparatus.

A clamping diode may be connected to the output terminal 306 to prevent the terminal from becoming more negative than a predetermined voltage level to protect the diodes 308 and 310 against excessive back voltages and to provide the proper voltage levels for succeeding circuits.

Although gate 300 is shown having only two input terminals, it should be realized that gates having three or more input terminals can be constructed by using the same techniques as are used in the construction of gate 300.

*Buffer*

The buffers used in the apparatus are also known as "or" gates. Each buffer comprises a crystal diode network which functions to receive input signals via a plurality of input terminals and to pass the most positive signal.

The symbol for a representative buffer 330, having two input terminals 332 and 334, is shown in Fig. 5*a*. In general the signal potential levels in the system are minus ten volts and plus five volts and either one of these potentials may exist at the input terminals 332 and 334.

If a positive potential of five volts exists at one or both of the input terminals 332 or 334, a positive potential of five volts exists at the output terminal 336. If a negative potential of ten volts is present at both of the input terminals 332 and 334, a negative potential of ten volts will be present at the output terminal 336.

The schematic details of the buffer 330 are shown in Fig. 5*b*. The buffer 330 includes the two crystal diodes 338 and 340. The crystal diode 338 comprises the anode 342 and the cathode 344. Crystal diode 40 comprises the anode 346 and the cathode 348. The anode 342 of the crystal diode 338 is coupled to the input terminal 332. The anode 346 of the crystal diode 340 is coupled to the input terminal 334. The cathodes 344 and 348 of the crystal diodes 338 and 340, respectively, are joined at the junction 350 which is coupled to the output terminal 336, and via the resistor 352 to the negative supply bus 70. The negative supply bus 70 tends to make the cathodes 344 and 348 more negative than the anodes 342 and 346, respectively, causing both crystal diodes 338 and 340 to conduct.

When negative ten volt signals are simultaneously present at input terminals 332 and 334, the crystal diodes 338 and 340 are conductive, and the potential at the cathodes 344 and 348 approaches the magnitude of the potential at the anodes 342 and 346. As a result, a negative potential of ten volts appears at the output terminal 336.

If the potential at one of the input terminals 332 or 334 increases to plus five volts, the potential at the junction 350 approaches the positive five volts level as this voltage is passed through the conducting crystal diode 338 or 340 to which the voltage is applied. The other crystal diode 338 or 340 stops conducting since its anode 342 or 346 becomes more negative than the junction 350. As a result, a positive potential of five volts appears at the output terminal 336.

If positive five volt signals are fed simultaneously to both input terminals 332 and 334, a positive potential of five volts appears at the output terminal 336, since both crystal diodes 338 and 340 will remain conducting. Thus the buffer 330 functions to pass the most positive signal received via the input terminals 332 and 334.

*Delay line*

The symbol for a representative electrical delay line 360 which is a lumped parameter type delay line and which functions to delay received pulses for discrete periods of time, is shown in Fig. 6*a*.

The delay line 360 comprises the input terminal 362, the output terminal 364, and a plurality of taps **366*a*, 366*b* and 366*c*. A pulse which is fed via the input terminal 362 to the delay line 360 will be delayed for an increasing number of pulse times before successively appearing at the taps 366*a*, 366*b* and 366*c*. When the pulse reaches the output terminal 364, the total delay provided by the delay line 360** has been applied. In the text, the specific number of pulse-times delay which is encountered before a pulse travels from the input terminal to a tap or to the output of the delay line is stated.

The schematic of delay line 360 is shown in Fig. 6*b*. Delay line 360 comprises a plurality of inductors 368 connected in series, with the associated capacitors 370 which couple a point 372 on each inductor 368 to ground. A signal is fed into the delay line 360 at the input terminal 362 and the maximum delay occurs at the output terminal 364. The taps 366 are each connected to one of the points 372 and provide varied delays. The delay line 360 is terminated by a resistor 374 in order to prevent reflections. Although in the delay line of Fig. 6*b* a tap is shown connected to each of the points 372, it should be understood that in actual practice there are ordinarily several untapped points 372 between successive taps.

*D.-C. amplifier*

The symbol for a representative D.-C. amplifier 148 is shown in Fig. 7*a*. When a positive signal is present at the input terminal 150, a positive signal of five volts appears at the positive output terminal 236 and a negative signal of ten volts is present at the negative output terminal 238. If a negative potential is present at the input terminal 150, the potentials at the output terminals 236 and 238 are reversed.

As shown in Fig. 7*b*, the D.-C. amplifier 148 includes the gate 154, the buffer 156, the vacuum tube 160, the transformer 179, the full-wave rectifiers 186 and 188, and the filters 220 and 214.

The input terminal 150 is connected to one input terminal of the gate 154. The other input of the gate 154 is fed a one megacycle carrier signal from the signal generator 152 which is a signal generator of known type. The megacycle carrier signal swings from minus ten to plus five volts.

One input of the buffer 156 is connected to the output of the gate 154. The other input of the buffer 156 is connected to the negative supply bus 5. The buffer 156 couples the output of the gate 154 to the control grid 170 of the vacuum tube 160.

The vacuum tube 160 is a five element tube having a grounded cylindrical shield 164, and includes the anode 162 connected via the primary winding 182 of the transformer 179 to a positive supply bus 250. The junction of positive supply bus 250 and the primary winding 182 is coupled via the capacitor 184 to ground. The vacuum tube 160 also includes the suppressor grid 166 which is connected to ground, the screen grid 168 which is connected to the positive supply bus 125 and via the capacitor 158 to ground, and the cathode 172 which is grounded.

The anode 162 of the vacuum tube 160 is also connected via the coupling capacitor 174 to neon tube 176 which is grounded. The capacitor 180 is connected in parallel with the primary winding 182 of the transformer 179 to form the parallel tank circuit 178 which is tuned to the frequency of the carrier signal.

The full-wave rectifier 186 is connected to the secondary winding 191 having its center tap 187 connected to the negative supply bus 10. The full-wave rectifier 186 includes the pair of crystal diodes 190 and 196. The anodes 192 and 198 of the crystal diodes 190 and 196 are respectively coupled to opposite ends of the secondary winding 191 of the transformer 179, and the cathodes 194 and 200 of the crystal diodes 190 and 196 are interconnected.

The full-wave rectifier 188 is connected to the secondary winding 193 having its center tap 189 connected to the positive supply bus 5.

The full-wave rectifier 188 includes the pair of crystal diodes 202 and 208. The cathodes 204 and 210 of the crystal diodes 202 and 208 are coupled to opposite ends of the secondary winding 193 and the anodes 206 and 212 of the crystal diodes 202 and 208 are connected together.

The filter 220 which couples the cathodes 194 and 200 of the crystal diodes 190 and 196 to the positive output terminal 236 is a parallel tank circuit which includes the capacitor 224 and the inductor 222. The capacitor 226 connects the positive output terminal 236 to the negative supply bus 10. The positive output terminal 236 is also coupled via the resistor 230 to the negative supply bus 70.

The filter 214, which couples the anodes 206 and 212 of the crystal diodes 202 and 208 to the negative output terminal 238, is a parallel tank circuit which includes the capacitor 218 and the inductor 216. The capacitor 228 connects the negative output terminal 238 to the positive supply bus 5. The negative output terminal 238 is also coupled by the resistor 234 to the positive supply bus 65.

Initially, the crystal diodes 190 and 196 are in a conductive state such that the potential at the positive output terminal 236 is approximately minus ten volts. Similarly, the crystal diodes 202 and 208 are initially in a conductive state such that the potential at the negative output terminal 238 is approximately plus five volts.

When a signal is fed to the input terminal 150 it is combined with the one megacycle carrier and fed to the buffer 156. As previously noted, one input terminal of the buffer 156 is connected to a negative five volts supply bus so that all signals at the output of gate 156 which are equal to or more positive than minus five volts will be passed by the buffer 156. A signal passed by the buffer 156 is applied to the control grid 170 of the vacuum tube 160. The signal is amplified by vacuum tube 160 and appears across the parallel tank circuit 178. The parallel tank circuit 178 is tuned to the frequency of the incoming signal so that the maximum signal will be passed by the parallel tank circuit 178 to the full-wave rectifiers 186 and 188.

The full-wave rectifier 186 delivers a positive signal which is then filtered by the filter 220 to appear as a positive direct-current potential of approximately five volts at the positive output terminal 236. The full-wave rectifier 188 delivers a negative signal which is then filtered by the filter 214 to appear as a negative direct-current potential of approximately ten volts at the negative output terminal 238.

Thus, if a positive signal is present at the input terminal 150, the voltage at the positive output terminal 236 is plus five volts, and the potential at the negative output terminal 238 is minus ten volts. However, if no signal is present at the input terminal 150, the voltage as the positive output terminal 236 will be minus ten volts, and the potential at the negative output terminal 238 will be plus five volts.

Generally, it should be noted that this D.-C. amplifier is a carrier type D.-C. amplifier with positive and negative output signals comprising only one vacuum tube and producing output signals equal in magnitude to the input signals. It should also be noted that the D.-C. amplifier includes a transformer and rectifiers for producing output signals of the desired magnitude from a low impedance source, the D.-C. amplifier thereby being especially adaptable for use in conjunction with networks of crystal diodes.

*Flip flop*

A flip flop of the type used in the apparatus is a bistable electronic circuit with two output terminals, one of which is maintained at one potential level and the other of which is maintained at a second potential level to indicate one stable state. Upon receipt of a signal of suitable magnitude at its input terminal the potential levels of the two output terminals are interchanged to indicate a second stable state.

The symbol for a representative flip flop 380 is illustrated in Fig. 8*a*. The flip flop 380 comprises the input terminal 382, reset terminal 384, positive output terminal 386, and negative output terminal 388.

One stable state of the flip flop 380 is the normal condition which is designated "reset" and exists when a negative potential of ten volts appears at the positive output terminal 386 and a positive potential of five volts appears at the negative output terminal 388. The second stable state is designated "set" and exists when a positive potential of five volts appears at the positive output terminal 386 and a negative potential of ten volts appears at the negative output terminal 388.

The flip flop 380 is set when a positive input signal is received via its input terminal 382, provided no reset signal is simultaneously transmitted to the reset terminal 384 of the flip flop 380.

Once set, the flip flop remains set as long as positive signals are received via the reset terminal 384 even though the "setting" pulse or signal has terminated. When the signal received via the reset terminal 384 becomes negative, the flip flop 380 is reset even if a positive pulse or signal is simultaneously being received via the input terminal 382.

Stated more generally, the flip flop 380 is set by the receipt of a positive input signal via the input terminal 382 and is reset by a negative signal at reset terminal 384. After being reset, the flip flop 380 remains reset until the above recited set conditions are fulfilled.

The detailed circuitry of the flip flop 380 is illustrated in Fig. 8*b* employing some of the logical symbols previously described.

The flip flop 380 comprises the buffer 390, the D.-C. amplifier 394 and the gate 392.

The input terminal 382 is an input terminal of the buffer 390. A positive signal which is transmitted to the input terminal 382 is passed through the buffer 390 to an input terminal of gate 392. If a positive signal is present at reset terminal 384, the other input terminal of gate 392, the positive signal present at input terminal 382 is passed by gate 392 to the input of D.-C. amplifier 394 to generate a positive potential of five volts at its positive output terminal 386 and a negative potential of ten volts at its negative output terminal 388.

The positive output terminal 386 of the D.-C. amplifier 394 is coupled back to the buffer 390. When a positive signal is present at the output terminal 386 the positive signal passes through the buffer 390 to gate 392. Thus a feedback path is provided which enables the positive potential of five volts to be maintained at the positive output terminal 386 and which is blocked only when a negative signal causes the gate 392 to be blocked.

It should be noted that a reset signal which causes the gate 392 to be blocked will prevent a set signal at the buffer 390 from causing the D.-C. amplifier 394 to generate a positive potential of five volts at its positive output terminal 386 during the existence of the set signal.

Thus has been shown an information handling system permitting an automatic retransfer of the information upon occurrence of an error. In the preferred embodiment the error detecting scheme is shown using a count of the total number of bits of information in a block.

In a second embodiment the error detecting scheme uses the well known odd-even check where the number of binary ones in a sub-unit of a block is always kept either odd or even. Then a count of the number of binary ones in each sub-unit is kept during a transfer operation. Whenever the count does not have the proper oddness or evenness an error is detected for initiating the retransfer cycle.

In a third embodiment the information is recorded on two parallel channels of the magnetic tape. During the transfer operation, both channels are simultaneously reproduced and compared. Whenever a difference in the information exists an error is thus detected and a retransfer initiated.

There will be now obvious to those skilled in the art many modifications and variations utilizing the principles set forth and realizing many or all of the objects and advantages of the circuits described but which do not depart essentially from the spirit of the invention.

What is claimed is:

1. Apparatus for controlling the correct transfer of blocks of information recorded on a tape to a storage device, each block of information comprising a pair of spaced block indicators, a plurality of information characters recorded on said tape between said block indicators and a predetermined number of information locating indicia recorded adjacent said information characters, said apparatus comprising a sensing device to transfer signals representing said information characters to said storage device, a counter, a second sensing device to transfer pulses representing said information locating indicia to said counter, a reversible tape driving means, a control unit settable to enable said tape driving means to drive said tape in a forward direction, block indicator detecting means, a comparison device energized by the second of said block indicators to determine if said counter has counted said predetermined number of indicia, a switching device controlled by said comparison device if said count is not said predetermined number to reset said control unit to enable said tape driving means to drive said tape in a reverse direction, means connected between said block indicator detecting means and said control unit to again set said control unit for the forward direction of tape drive when the first of said block indicators is detected during reverse travel of said tape to retransfer said information signals, and other means in said control unit to reset said counter as said control unit is set to enable a forward drive of said tape.

2. Apparatus as set out in claim 1 including an alarm device controlled by said control unit for operation if said counter does not count said predetermined number of indicia within a preset time interval.

3. Apparatus for the correction of errors occurring in the transfer of information from a magnetic tape to a storage device, said tape having said information recorded thereon as blocks of discrete signals, each block being embraced by start and termination signals and each block having a predetermined number of information location signals recorded therein, said apparatus comprising means to drive said tape in a forward or a reverse direction, a control means settable to energize said tape driving means and to determine the direction of drive of said means, tape sensing and transferring means operative during forward driving of said tape to transfer signals representing said information to said storage device, means to count the number of information location signals recorded within a block of signals, an initiating means to set said control means to drive said tape in a forward direction, a block signal detecting device to restore said control means to normal condition upon detection of a block termination signal, a sampling device jointly activated by said control means when set for driving said tape in a forward direction, by said detecting device upon detection of a block signal and by said counting means to reset said control means to drive said tape in a reverse direction if said counter has not counted said predetermined number of information location signals at the end of a block, said control means being again set for forward driving of said tape by said block signal detecting means when the block start signal is detected.

4. Apparatus as set out in claim 3 including means in said control unit to reset said counting means each time said control unit is set to drive said tape in the forward direction and an error alarm actuated by said control unit if said control unit remains activated for more than a preset time interval.

References Cited in the file of this patent

UNITED STATES PATENTS

| | | |
|---|---|---|
| 2,680,240 | Greenfield | June 1, 1954 |
| 2,696,599 | Holbrook et al. | Dec. 7, 1954 |
| 2,706,215 | Van Duuren | Apr. 12, 1955 |
| 2,735,889 | Canfora | Feb. 21, 1956 |
| 2,782,398 | West et al. | Feb. 19, 1957 |
| 2,813,259 | Burkhart | Nov. 12, 1957 |